US009085228B2

(12) United States Patent
Aoki

(10) Patent No.: US 9,085,228 B2
(45) Date of Patent: Jul. 21, 2015

(54) VEHICULAR CONTROL DEVICE AND METHOD OF CONTROLLING A VEHICLE

(75) Inventor: Takanori Aoki, Nisshin (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1173 days.

(21) Appl. No.: 12/447,928

(22) PCT Filed: Jul. 19, 2007

(86) PCT No.: PCT/JP2007/064629
§ 371 (c)(1),
(2), (4) Date: Apr. 30, 2009

(87) PCT Pub. No.: WO2008/075479
PCT Pub. Date: Jun. 26, 2008

(65) Prior Publication Data
US 2010/0049387 A1  Feb. 25, 2010

(30) Foreign Application Priority Data

Dec. 19, 2006 (JP) ................................. 2006-341664

(51) Int. Cl.
*B60K 6/445* (2007.10)
*B60K 6/365* (2007.10)
(Continued)

(52) U.S. Cl.
CPC .............. *B60K 6/445* (2013.01); *B60K 6/365* (2013.01); *B60K 6/547* (2013.01); *B60L 7/14* (2013.01); *B60L 11/123* (2013.01); *B60L 11/14* (2013.01); *B60W 10/06* (2013.01); *B60W 10/08* (2013.01); *B60W 10/115* (2013.01); *B60W 30/18127* (2013.01); *F02D 41/023* (2013.01); *B60K 1/02* (2013.01); *B60L 2240/441* (2013.01); *B60L 2240/486* (2013.01); *B60L 2240/80* (2013.01); *B60W 20/00* (2013.01); *B60W 2510/0638* (2013.01); *B60W 2510/1005* (2013.01);
(Continued)

(58) Field of Classification Search
CPC ....... B60L 11/123; B60L 11/14; B60K 6/365; B60K 6/445; B60K 6/547; F02D 41/023; B60W 10/06; B60W 10/08; B60W 10/115; B60W 20/00; Y10T 477/23; Y10T 477/675; Y10T 477/677; Y10T 477/679
USPC .................. 701/22, 51, 102, 110, 93, 95, 54; 180/65.21–65.8; 903/902; 123/350, 123/352
See application file for complete search history.

(56) References Cited

U.S. PATENT DOCUMENTS 4,335,429 A * 6/1982 Kawakatsu ................... 701/102
5,801,499 A * 9/1998 Tsuzuki et al. ............... 318/141
(Continued)

FOREIGN PATENT DOCUMENTS

JP  10-002241 A  1/1998
JP  2003-335152 A  11/2003
(Continued)

*Primary Examiner* — Joseph Rocca
*Assistant Examiner* — Maurice Williams
(74) *Attorney, Agent, or Firm* — Kenyon & Kenyon LLP

(57) ABSTRACT

An ECU executes a program including the steps of: calculating a period of time elapsing after a stage was immediately previously shifted before the stage is currently shifted; if the elapsed period of time is at most a predetermined period of time, performing a process to advance an elevation rate applied to the rotation speed of an engine; determining an elevation rate applied to the rotation speed of the engine; and performing a process to control elevating the rotation speed of the engine.

14 Claims, 7 Drawing Sheets

(51) Int. Cl.
*B60L 11/12* (2006.01)
*B60W 10/06* (2006.01)
*B60W 10/08* (2006.01)
*F02D 41/02* (2006.01)
*B60K 6/547* (2007.10)
*B60L 7/14* (2006.01)
*B60L 11/14* (2006.01)
*B60W 10/115* (2012.01)
*B60W 30/18* (2012.01)
*B60K 1/02* (2006.01)
*B60W 20/00* (2006.01)
*F02D 31/00* (2006.01)
*F16H 3/72* (2006.01)
*F16H 37/08* (2006.01)

(52) U.S. Cl.
CPC ........ *B60W2520/10* (2013.01); *B60W 2540/10* (2013.01); *B60W 2710/0644* (2013.01); *B60W 2710/0661* (2013.01); *F02D 31/001* (2013.01); *F16H 3/728* (2013.01); *F16H 2037/0873* (2013.01); *Y02T 10/6217* (2013.01); *Y02T 10/6239* (2013.01); *Y02T 10/6286* (2013.01); *Y02T 10/7077* (2013.01)

(56) References Cited

U.S. PATENT DOCUMENTS

| | | | |
|---|---|---|---|
| 6,054,776 A * | 4/2000 | Sumi | 290/17 |
| 6,085,140 A * | 7/2000 | Choi | 701/55 |
| 6,093,974 A * | 7/2000 | Tabata et al. | 290/40 R |
| 6,324,449 B2 * | 11/2001 | Albert et al. | 701/22 |
| 6,437,456 B1 * | 8/2002 | Kimura et al. | 290/40 C |
| 7,010,400 B2 * | 3/2006 | Hisada et al. | 701/22 |
| 7,558,660 B2 * | 7/2009 | Izumi et al. | 701/51 |
| 2001/0032040 A1 * | 10/2001 | Albert et al. | 701/22 |
| 2002/0082759 A1 * | 6/2002 | Katakura et al. | 701/54 |
| 2003/0130779 A1 * | 7/2003 | Shiimado et al. | 701/65 |
| 2004/0058779 A1 * | 3/2004 | Ayabe | 477/121 |
| 2004/0162182 A1 * | 8/2004 | Joe et al. | 477/2 |
| 2005/0203678 A1 * | 9/2005 | Suzuki et al. | 701/22 |
| 2005/0209760 A1 * | 9/2005 | Tabata et al. | 701/53 |
| 2005/0256631 A1 * | 11/2005 | Cawthorne et al. | 701/99 |
| 2007/0111848 A1 * | 5/2007 | Tabata et al. | 477/3 |
| 2009/0008168 A1 * | 1/2009 | Yamanaka et al. | 180/65.4 |
| 2009/0048747 A1 * | 2/2009 | Stridsberg | 701/55 |

FOREIGN PATENT DOCUMENTS

| | | |
|---|---|---|
| JP | 2005-164046 A | 6/2005 |
| JP | 2006-020481 A | 1/2006 |
| JP | 2006-021622 A | 1/2006 |
| JP | 2006-067654 A | 3/2006 |
| JP | 2006-256595 A | 9/2006 |

* cited by examiner

F I G. 4
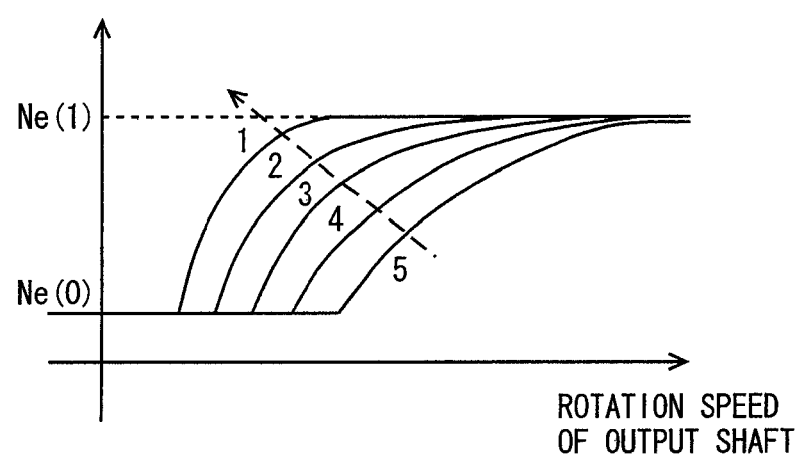

VEHICULAR CONTROL DEVICE AND METHOD OF CONTROLLING A VEHICLE

This is a 371 national phase application of PCT/JP2007/064629 filed 19 Jul. 2007, claiming priority to Japanese Patent Application No. 2006-341664 filed 19 Dec. 2006, the contents of which are incorporated herein by reference.

TECHNICAL FIELD

The present invention relates to controlling a vehicle that has an internal combustion engine and a rotating electric machine as driving sources in response to an operation of the driver to vary engine braking force stepwise, and particularly to controlling the vehicle in response to the driver's operation to set a rate of change that is applied to the rotation speed of the internal combustion engine.

BACKGROUND ART

Conventionally there have been a large number of techniques implementing force driving vehicles to meet drivers' demands. For example, Japanese Patent Laying-open No. 2006-020481 discloses a motive power output device achieving a good feel for driving. This motive power output device is capable of outputting motive power to a drive shaft. The motive power output device includes: an internal combustion engine; an electric power/motive power input/output means connected to an output shaft of the internal combustion engine and the drive shaft and capable of inputting/outputting electric power/motive power to output at least a portion of motive power from the internal combustion engine to the drive shaft; an electric motor capable of inputting and outputting motive power to the drive shaft; an electricity storage means capable of communicating electric power with the electric power/motive power input/output means and the electric motor; required-driving-force setting means setting the drive shaft's required driving force in accordance with an operator's operation; target motive power setting means setting a target motive power of the internal combustion engine in accordance with the set, required driving force; and drive control means that normally exerts control to drive the internal combustion engine, the electric power/motive power input/output means and the electric motor to output the set target motive power from the internal combustion engine and also output driving force based on the required driving force to the drive shaft, and exerts control in response at least to the target motive power varying in sign to drive the internal combustion engine, the electric power/motive power input/output means and the electric motor to output driving force based on the required driving force to the drive shaft while maintaining the rotation speed of the internal combustion engine before and after the target motive power varies in sign.

The disclosed motive power output device can prevent the internal combustion engine from being operated with its rotation speed different from that which the operator normally expects when the internal combustion engine's target motive power for outputting the required driving force based on the operator's operation varies in sign. As a result a satisfactory feel for drive can be achieved.

The above publication describes setting a shift position that allows a vehicle to manifest engine braking force. As such a shift position, a plurality of stages of shift positions are set to manifest engine braking force in stages in magnitude. In this case, the engine braking force is implemented by setting for each stage a lower limit value for the rotation speed of the internal combustion engine. For example, if a driver operates a shift lever to a low stage, then the lower limit value for the rotation speed is set to increase and accordingly the internal combustion engine has its rotation speed elevated by MG1. This manifests an engine braking effect as intended by the driver.

However, if the internal combustion engine has its rotation speed uniformly elevated regardless of how the shift lever is operated, and the driver shifts between a plurality of stages quickly, the internal combustion engine nonetheless has its rotation speed varied at a uniform rate of change. As such, if the driver quickly shifts between a plurality of stages to manifest larger engine braking force, the internal combustion engine may have its rotation speed varying slower than expected by the driver. This cannot achieve a satisfactorily responsive engine braking effect as intended by the driver.

DISCLOSURE OF THE INVENTION

The present invention contemplates a vehicular control device that allows a vehicle having an internal combustion engine and a rotating electric machine as driving sources to manifest engine braking force in response to the driver's operation with good responsiveness, and a method of controlling the vehicle.

The present invention in one aspect provides a vehicular control device for a vehicle with an internal combustion engine and a rotating electric machine serving as driving sources. The vehicle includes a first rotating electric machine coupled with an output shaft of the internal combustion engine and generating electric power based on motive power of the internal combustion engine, and a power split device transmitting the motive power of the internal combustion engine to a wheel shaft of the vehicle. The power split device splits the motive power received from the internal combustion engine into one of driving force for the wheel shaft and motive power for the first rotating electric machine. Between the power split device and the wheel shaft a second rotating electric machine is provided to provide the wheel shaft with driving force. The vehicular control device includes: a detection unit detecting the state of an operation member operated to select a shift position of a plurality of shift positions corresponding to a plurality of stages, respectively, each with a lower limit value for the rotation speed of the internal combustion engine; and an operation unit connected to the detection unit. The operation unit determines from the state as detected whether the shift position has been changed. The operation unit sets a rate of change applied to the rotation speed of the internal combustion engine in accordance with an elapsed period of time elapsing after the shift position was previously changed before the shift position is currently changed. The operation unit controls the first rotating electric machine in accordance with the rate of change, as set, to allow the internal combustion engine to have the rotation speed set at least the lower limit value corresponding to the shift position. The present invention in another aspect provides a method of controlling a vehicle, that has a configuration similar to that of the vehicular control device described above.

In accordance with the present invention an internal combustion engine has its rotation speed changed in accordance with a rate of change set in accordance with a period of time elapsing after a shift position was previously changed before the shift position is currently changed. Thus the internal combustion engine can have its rotation speed in accordance with a rate of change that is changed in accordance with how the operation member is operated (i.e., an interval between an operation changing a shift position and another such operation). For example, if the elapsed period of time is at most a predetermined period of time, the rate of change applied to the rotation speed is increased, so that if the driver quickly changes a shift position, the rate of change applied to the rotation speed is set to increase, and the internal combustion engine has its rotation speed rapidly elevating, as controlled by the first rotating electric machine. Thus if the driver attempts to obtain large engine braking force and accordingly changes a shift position quickly, the driver can be prevented from feeling a delay in varying the rotation speed of the internal combustion engine. Consequently, for example, by ceasing to supply the internal combustion engine with fuel, the power attributed to the friction of the internal combustion engine that corresponds to the rotation speed of the internal combustion engine acts on the wheel shaft via the power split device to allow the vehicle to manifest engine braking force, as intended by the driver, with good responsiveness. Thus there can be provided a vehicular control device allowing a vehicle having an internal combustion engine and a rotating electric machine as driving sources to manifest engine braking force in response to the driver's operation with good responsiveness, and a method of controlling the vehicle.

Preferably the operation unit sets the rate of change to increase as the elapsed period of time is shorter.

In accordance with the present invention the rate of change is set to increase as the elapsed period of time is shorter. Thus the internal combustion engine can have its rotation speed changed in accordance with a rate of change increased if a shift position is changed by operations having a shorter interval therebetween. Thus the internal combustion engine has its rotation speed rapidly elevating as controlled by the first rotating electric machine. Thus if the driver attempts to obtain large engine braking force and accordingly changes a shift position quickly, the driver can be prevented from feeling a delay in varying the rotation speed of the internal combustion engine. Consequently, the vehicle can manifest engine braking force, as intended by the driver, with good responsiveness.

Still preferably the operation unit sets the rate of change to increase by a predetermined value if the elapsed period of time is at most a predetermined period of time.

In accordance with the present invention the rate of change is set to increase by a predetermined value if the elapsed period of time is at most a predetermined period of time. Thus if a shift position is changed by operations with a short interval therebetween, the internal combustion engine can have its rotation speed changed in accordance with an increased rate of change. Thus the internal combustion engine has its rotation speed rapidly elevating as controlled by the first rotating electric machine. Thus if the driver attempts to obtain large engine braking force and accordingly changes a shift position quickly, the driver can be prevented from feeling a delay in varying the rotation speed of the internal combustion engine. Consequently, the vehicle can manifest engine braking force, as intended by the driver, with good responsiveness.

Preferably the operation unit determines whether the shift position is changed to another one of the shift positions that increases the lower limit value.

In accordance with the present invention, if a shift position is changed by operations with a short interval therebetween to another shift position increasing the lower limit value for the rotation speed of the internal combustion engine, the rate of change applied to the rotation speed is set to increase. Thus the internal combustion engine has its rotation speed rapidly elevating as controlled by the first rotating electric machine. In other words, the internal combustion engine can have its rotation speed controlled to rapidly attain at least the lower limit value corresponding to the changed shift position. Thus if the driver attempts to obtain large engine braking force and accordingly changes a shift position quickly, the internal combustion engine can be prevented from having its rotation speed varied with delay, and engine braking force as intended by the driver can also be manifested with good responsiveness.

Still preferably the vehicular control device further includes a revolution detection unit connected to the operation unit for detecting the rotation speed of the internal combustion engine. If the rotation speed detected is at least the lower limit value corresponding to the shift position changed, the operation unit controls the internal combustion engine to cease to inject fuel for the internal combustion engine.

In accordance with the present invention when a shift position is changed and the rotation speed detected is at least the lower limit value, injecting fuel to the internal combustion engine can be ceased to appropriately control the rotation speed of the internal combustion engine.

Still preferably, the power split device, the second rotating electric machine and the wheel shaft are connected, with a transmission posed therebetween, and the transmission changes torque of the second rotating electric machine and transmits the changed torque to the wheel shaft.

Thus the present invention can also be applied to a vehicle that has a transmission changing the torque of the second rotating electric machine and transmitting it to the wheel shaft, to manifest engine braking force in response to the driver's operation with good responsiveness.

Still preferably the vehicular control device further includes a requirement detection unit connected to the operation unit for detecting a degree of a requirement of force driving the vehicle. If the degree of the requirement detected is substantially zero, the operation unit controls the first rotating electric machine to allow the internal combustion engine to have the rotation speed set at least the lower limit value corresponding to the shift position.

In accordance with the present invention if a degree of a requirement as detected (e.g., an accelerator pedal position) is substantially zero, the first rotating electric machine is controlled to allow the internal combustion engine to have its rotation speed set at least the lower limit value corresponding to the shift position. An appropriate engine braking effect can thus be obtained.

BRIEF DESCRIPTION OF THE DRAWINGS

FIG. 4 is a map showing the lower limit values for the rotation speed of an engine, that correspond to stages, respectively, in accordance with the rotation speed of an output shaft.

BEST MODES FOR CARRYING OUT THE INVENTION

Hereinafter reference will be made to the drawings to describe an embodiment of the present invention. In the following description, identical components are identically denoted. Their names and functions are also identical. Accordingly, they will not be described repeatedly in detail.

Figure 1:
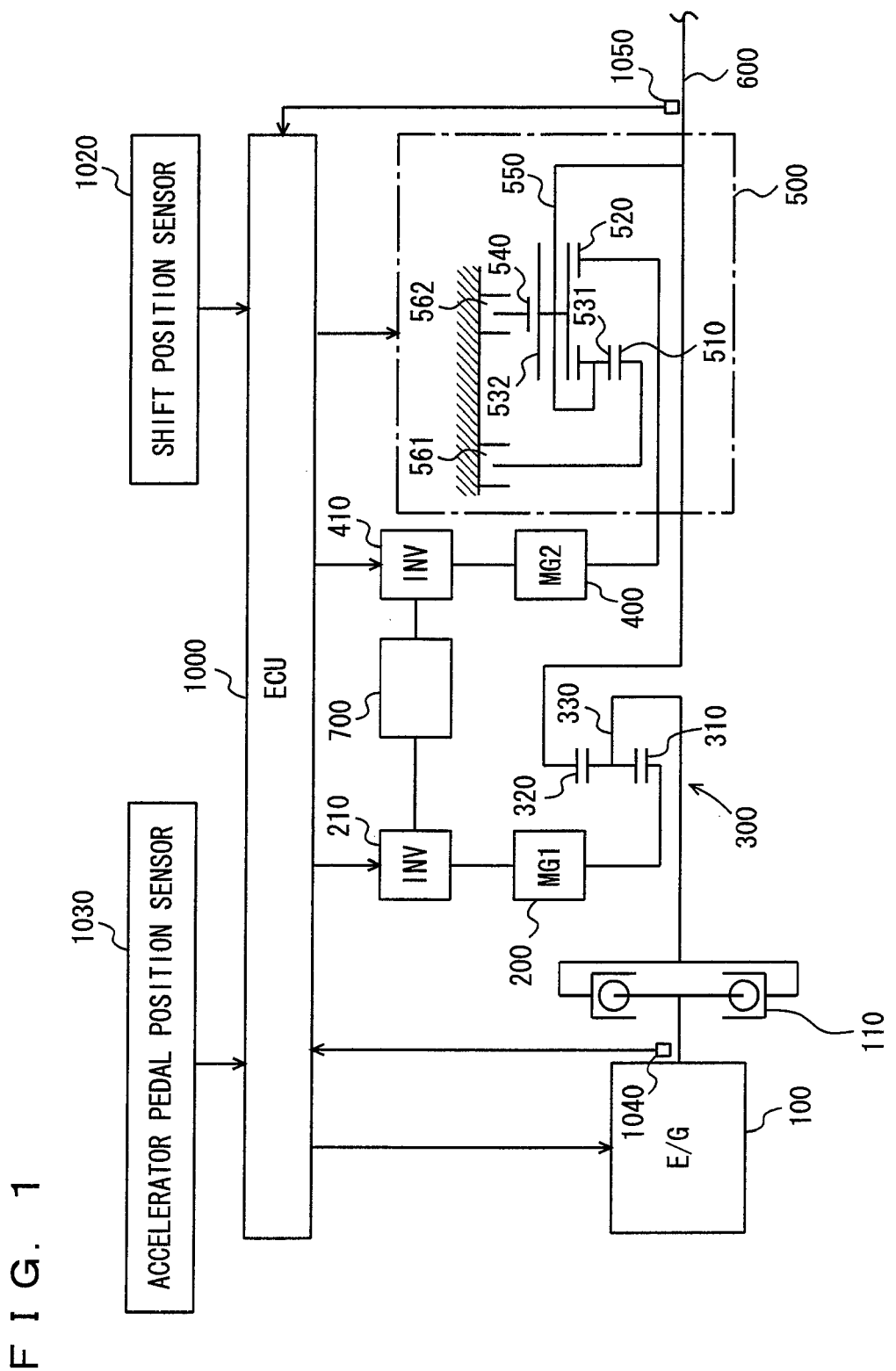
FIG. 1 schematically shows a configuration of a power train of a hybrid vehicle.

With reference to FIG. 1, the present embodiment provides a control device mounted in a hybrid vehicle having a power train as will be described hereinafter. Note that the control device of the present embodiment is implemented by a program executed by an electronic control unit (ECU) 1000.

As shown in FIG. 1, the power train is configured mainly of an engine 100, a motor generator (MG) (1) 200, a power split device 300 adding or splitting a torque between engine 100 and MG (1) 200, an MG (2) 400, and a transmission 500.

Engine 100 has an output shaft coupled via power split device 300 to MG (1) 200 generating electric power based on motive power of engine 100. Power split device 300 transmits the motive power of engine 100 to an output shaft 600 connected to a wheel shaft of the vehicle. Power split device 300 splits the motive power received from engine 100 into motive power for one of output shaft 600 and MG (1) 200. Between power split device 300 and output shaft 600 there is provided MG (2) 400 providing output shaft 600 with driving force. Power split device 300, MG (2) 400 and output shaft 600 are connected together with transmission 500 posed therebetween. Transmission 500 changes the torque of MG (2) 400 and transmits it to output shaft 600. Transmission 500 is configured for example of a planetary gear mechanism.

Engine 100 is a gasoline engine, a diesel engine or a similar known motive power device combusting fuel to output motive power and is configured to allow a throttle angle (an amount of intake air), an amount of fuel supplied, a timing of ignition, and other operation states to be electrically controlled. It is controlled for example by ECU 1000 having a microcomputer serving as a main component.

MG (1) 200 is by way of example a 3-phase alternate current rotating electric machine and configured to provide a function serving as a motor and that serving as a power generator. It is connected via an inverter 210 to a battery or a similar electricity storage device 700. Inverter 210 can be controlled to set a torque output from MG (1) 200 or a regenerative torque thereof, as appropriate. It is controlled by ECU 1000. Note that MG (1) 200 has a stator (not shown) fixed and thus prevented from rotation.

Power split device 300 is a known gear mechanism causing a differential action such that an externally toothed sungear (S) 310, an internally toothed ring gear (R) 320 arranged concentrically with respect to sungear (S) 310, and a carrier (C) 330 holding a pinion gear, which meshes with sungear (S) 310 and ring gear (R) 320, to rotate and revolve as desired serve as three rotative elements. Engine 100 has its output shaft coupled via a damper 110 to a first rotative element, i.e., carrier (C) 330. In other words, carrier (C) 330 acts as an input element.

In contrast, to a second rotative element, i.e., sungear (S) 310, is connected a rotor (not shown) of MG (1) 200. Thus sungear (S) 310 serves as a so-called reaction element and a third rotative element, i.e., ring gear (R) 320, serves as an output element, and ring gear (R) 320 is coupled to output shaft 600 coupled to a driving wheel (not shown).

Figure 2:
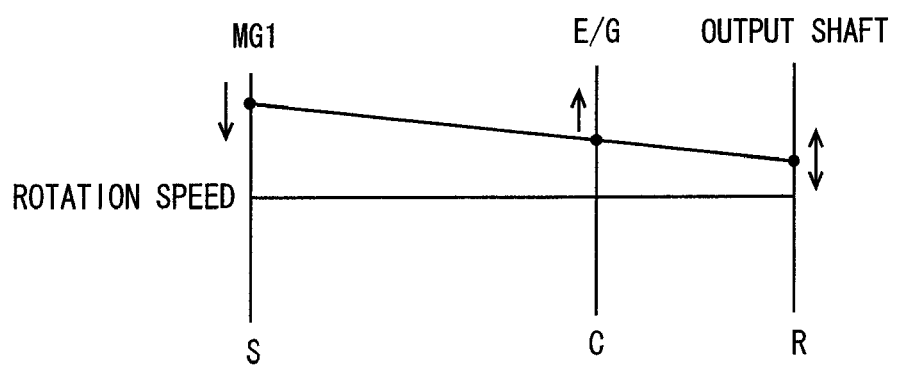
FIG. 2 is a nomographic chart of a power split device.

FIG. 2 is a nomographic chart of power split device 300. As shown in FIG. 2, for a torque output from engine 100 and received by carrier (C) 330, a reactive torque provided by MG (1) 200 is input to sungear (S) 310. These torques are added/subtracted, and a torque of a magnitude thus obtained appears at ring gear (R) 320 serving as the output element. In that case, MG (1) 200 has its rotor rotated by that torque, and MG (1) 200 functions as a power generator. Furthermore, if ring gear (R) 320 has its rotation speed (output) fixed, changing the rotation speed of MG (1) 200 to be large or small allows the rotation speed of engine 100 to vary continuously (or steplessly). More specifically, controlling to set the rotation speed of engine 100 to be that for example achieving the best fuel economy can be done by controlling MG (1) 200. It is controlled by ECU 1000.

If the vehicle is running and engine 100 is stopped, MG (1) 200 rotates backward, and if in that condition MG (1) 200 is controlled to function as a motor and output a torque in the direction of forward rotation, a torque having a direction allowing engine 100 coupled to carrier (C) 330 to rotate forward acts on engine 100, and engine 100 can be started (or motored or cranked) by MG (1) 200. In that case, a torque having a direction to stop output shaft 600 from rotating acts on the output shaft. Thus a drive torque for running can be maintained by controlling a torque output from MG (2) 400 and simultaneously engine 100 can be started smoothly. Note that this type of hybrid system is referred to as a mechanical distribution type or a split type.

With reference again to FIG. 1, MG (2) 400 is by way of example a 3-phase alternate current rotating electric machine and configured to provide a function serving as a motor and that serving as a power generator. It is connected via an inverter 410 to the battery or the similar electricity storage device 700. Inverter 410 can be controlled to control the drive and regenerative states of MG (2) 400 and the torque thereof in each state. Note that MG (2) 400 has a stator (not shown) fixed and thus prevented from rotating.

Transmission 500 is configured of a set of a Ravignaux type of planetary gear mechanisms provided with externally toothed, first and second sungears (S1) 510 and (S2) 520, with the first sungear (S1) 510 meshing with a first pinion 531 meshing with a second pinion 532 meshing with a ring gear (R) 540 which and sungears 510 and 520 are arranged concentrically.

Note that each pinion 531, 532 is held by a carrier (C) 550 to be rotated and revolved as desired. Furthermore the second sungear (S2) 520 meshes with the second pinion 532. Thus the first sungear (S1) 510 and ring gear (R) 540 together with pinions 531 and 532 configure a mechanism corresponding to a double-pinion planetary gear mechanism, and the second sungear (S2) 520 and ring gear (R) 540 together with the second pinion 532 configure a mechanism corresponding to a single-pinion planetary gear mechanism.

Furthermore transmission 500 is provided with a B1 brake 561 selectively fixing the first sungear (S1) 510 and a B2 brake 562 selectively fixing ring gear (R) 540. Brakes 561 and 562 are a so-called friction engagement element generating force for engagement by frictional force and can be implemented by an engagement device employing multiple plates or that employing a band. Brakes 561 and 562 are configured to have their respective torque capacities continuously varying with force depending on hydraulic pressure for engagement. Furthermore, to the second sungear (S2) 520, MG (2) 400 is coupled. Carrier (C) 550 is coupled to output shaft 600.

Thus transmission 500 has the second sungear (S2) 520 serving as a so-called input element and carrier (C) 550 serving as an output element, and B1 brake 561 can be engaged to set a high gear having a gear ratio larger than "1". Disengaging B1 brake 561 and engaging B2 brake 562 sets a low gear having a gear ratio larger than the high gear.

The gears are shifted as based on vehicular speed, driving force required (or accelerator pedal position) and/or a similar running condition. More specifically, a gear range is previously determined in the form of a map (a shift map) and one of the gears is set as controlled in accordance with a driving state detected.

Figure 3:
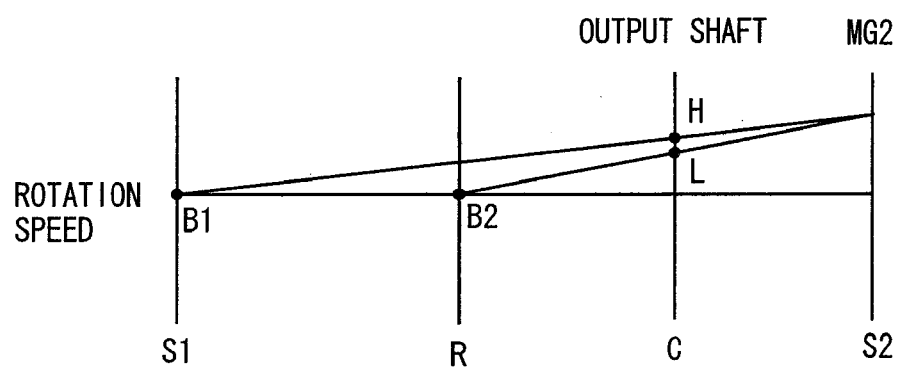
FIG. 3 is a nomographic chart of a transmission.

FIG. 3 is a nomographic chart of transmission 500. As shown in FIG. 3, when B2 brake 562 fixes ring gear (R) 540, a low gear L is set and a torque output from MG (2) 400 is amplified in accordance with a gear ratio and applied to output shaft 600. In contrast, when B1 brake 561 fixes the first sungear (S1) 510 a high gear H having a gear ratio smaller than low gear L is set. The gear ratio of high gear H is also larger than "1", and a torque output from MG (2) 400 is increased in accordance with that gear ratio and applied to output shaft 600.

Note that when gears L and H are normally set, output shaft 600 receives a torque output from MG (2) 400 that is increased in accordance with a gear ratio, whereas when the gears are being shifted, it receives a torque affected for example by the torque capacity at each brake 561, 562, and an inertia torque of MG (2) 400 that accompanies variation in the rotation speed of MG (2) 400. Furthermore when MG (2) 400 is in the driving state output shaft 600 receives a positive torque and when MG (2) 400 is in the driven state output shaft 600 receives a negative torque.

The above described power train includes two motive power sources, i.e., engine 100 and MG (2) 400, and they are effectively utilized to drive a vehicle sparing on fuel and exhausting a reduced amount of gas. Furthermore, if engine 100 is driven, the rotation speed of engine 100 is controlled by MG (1) 200 to achieve optimal fuel economy. Furthermore, in coasting, the vehicle has inertial energy, which is regenerated as electrical power, and when MG (2) 400 is driven to assist torque, and the vehicle has low speed, transmission 500 is set in low gear L to increase a torque applied to output shaft 600, and when the vehicle is increased in speed, transmission 500 is set in high gear H to relatively reduce the rotation speed of MG (2) 400 to reduce loss to efficiently assist torque.

The above described hybrid vehicle can be run by motive force generated by engine 100, both engine 100 and MG (2) 400, and MG (2) 400 alone, and which of these types of running should be selected is determined as based on accelerator pedal position or a similar drivability required, vehicular speed, and the like. For example if a battery is charged sufficiently and relatively small drivability is required, or quiet start is manually selected or the like, then a type of running that employs MG (2) 400 and is similar to that of an electric vehicle (hereinafter also described as "EV running" or the like for the sake of convenience) is selected, and engine 100 is stopped. If from that condition the accelerator pedal is pressed down or increased drivability is required, or the battery is decreased in availability, or quiet start is manually switched to normal running, then engine 100 is started to switch to a type of running that employs engine 100.

Furthermore in the present embodiment the vehicular control device or ECU 1000 is connected to a shift position sensor 1020, an accelerator pedal position sensor 1030, an engine revolution sensor 1040, and a vehicular speed sensor 1050.

Shift position sensor 1020 is provided in a shift position device ((not shown). The shift operation device is configured of a shift lever, a shift gate and shift position sensor 1020. The driver moves the shift lever along a path formed at the shift gate to change a shift position.

Shift position sensor 1020 detects the shift lever's state, i.e., a position that the shift lever assumes as it is operated. Shift position sensor 1020 transmits to ECU 1000 a shift operation signal indicating a position that the shift lever assumes as it is operated.

The shift position includes e.g., a parking position, a drive (or forward running) position, a reverse (or backward running) position, a neutral position, and an engine braking range position causing the vehicle to manifest engine braking force. When the driver moves the shift lever to the positions corresponding to the respective positions, a shift position is changed to another.

In the present embodiment the engine braking range position includes a plurality of shift positions limiting a lower limit value for the rotation speed of the engine in a plurality of stages and corresponding to the plurality of stages, respectively. The driver operates the shift lever to select one of the plurality of shift positions corresponding to the stages, respectively.

The engine braking range position includes shift positions corresponding for example to five stages. (Hereinafter the five stages will be referred to as first to fifth stages.) When the accelerator pedal position is substantially zero, i.e., when the accelerator pedal is not depressed, lower stages provide the rotation speed with lower limit values set to be larger, and thus generate larger engine braking force.

For example, the position of the shift gate that corresponds to the engine braking range position is provided with a (+) position, a (−) position, and a reference position. When the driver moves the shift lever from a shift position to the engine braking range position at the reference position, the driver can select stages in the engine braking range position. When the driver moves the shift lever to the (+) position or the (−) position, ECU 1000 operates in response to the shift operation signal to elevate/lower a stage.

Note that ECU 1000 may elevate a stage automatically in accordance with the output shaft and the rotation speed of the engine, and may lower a stage responsively as the shift lever is operated.

When the accelerator pedal is not depressed, and the shift lever is moved to a position corresponding to the engine braking range position, ECU 1000 operates MG (1) 200 to elevate the rotation speed of engine 100 to be equal to or larger than a lower limit value set in accordance with a stage. Furthermore, once the rotation speed of engine 100 has attained the lower limit value or larger, ECU 1000 stops supplying engine 100 with fuel.

Thus when the driver moves the shift lever from the reference position to the (+) position or the (−) position the engine braking force as intended by the driver is generated in the vehicle.

Note that the position of the shift gate that corresponds to the engine braking range position may be provided with shift positions corresponding to stages, respectively, in an order of magnitudes of engine braking force.

Accelerator pedal position sensor 1030 detects an amount by which the driver depresses the accelerator pedal (not shown). Note that in the present embodiment, detecting a degree of a requirement of force driving the vehicle suffices, and the present embodiment is not limited to an amount by which an accelerator pedal is depressed. Accelerator pedal position sensor 1030 transmits to ECU 1000 a signal indicating an amount by which the accelerator pedal is depressed.

Engine revolution sensor 1040 detects the rotation speed of engine 100. Engine revolution sensor 1040 transmits to ECU 1000 a signal indicating the rotation speed of engine 100 detected.

Vehicular speed sensor 1050 detects a physical quantity related to vehicular speed. In the present embodiment, vehicular speed sensor 1050 detects the rotation speed of output shaft 600. Vehicular speed sensor 1050 transmits to ECU 1000 a signal indicating the rotation speed of output shaft 600 detected. Note that ECU 1000 may calculate vehicular speed from the rotation speed of output shaft 600 received.

If in the vehicle of the present embodiment thus configured the driver changes a stage in the engine braking range position, then MG (1) 200 is controlled to attain at least that lower limit value for engine 100 which corresponds to the changed stage. At the time, MG (2) 400 is subjected to regenerative brake control or injecting fuel in engine 100 is ceased so that the power attributed to the friction of engine 100 corresponding to the rotation speed of engine 100 acts on output shaft 600 via power split device 300 to manifest engine braking force.

When the driver changes a shift position, ECU 1000 uses a map for example as shown in FIG. 4 to control the rotation speed of engine 100. The FIG. 4 map has a vertical axis representing the rotation speed of the engine and a horizontal axis representing the rotation speed of output shaft 600. The FIG. 4 map is stored previously for example in a memory of ECU 1000.

The FIG. 4 map shows solid lines, which indicate the lower limit values for the rotation speed of the engine, that correspond to stages, respectively. As shown in FIG. 4, the engine has its rotation speed with a lower limit value set to increase relative to the rotation speed of the output shaft stepwise for stages having smaller numbers within a predetermined range (Ne(0)-Ne(1)) of the rotation speed of the engine. Note that the predetermined range of the rotation speed of the engine is preset as based on an actual operation range of engine 100.

Herein let us assume that the driver driving the vehicle operates the shift lever to change a shift position from the fifth stage to the second stage stepwise.

For a shift position corresponding to the fifth stage, a lower limit value Ne(2) is calculated, as based on the rotation speed of output shaft 600, from a map corresponding to the fifth stage shown in FIG. 4, and the rotation speed of the engine is controlled based on lower limit value Ne(2) as calculated.

Figure 5:
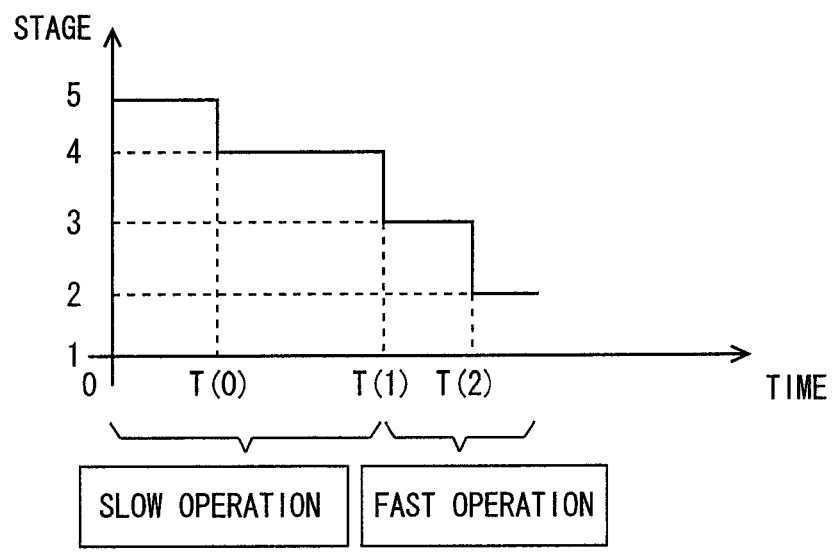
FIG. 5 is a timing plot (1) representing how a shift position varies.

At time T(0), as shown in FIG. 5, the driver operates the shift lever, and accordingly the fifth stage shifts to the fourth stage.

Accordingly, ECU 1000 calculates a lower limit value Ne(3), as based on the rotation speed of output shaft 600, from a map corresponding to the fourth stage shown in FIG. 4, and controls the rotation speed of the engine, as based on lower limit value Ne(3) as calculated. More specifically, ECU 1000 controls engine 100 or MG (1) 200 to elevate the rotation speed of engine 100 until at least lower limit value Ne(3) as calculated is attained.

Figure 6:
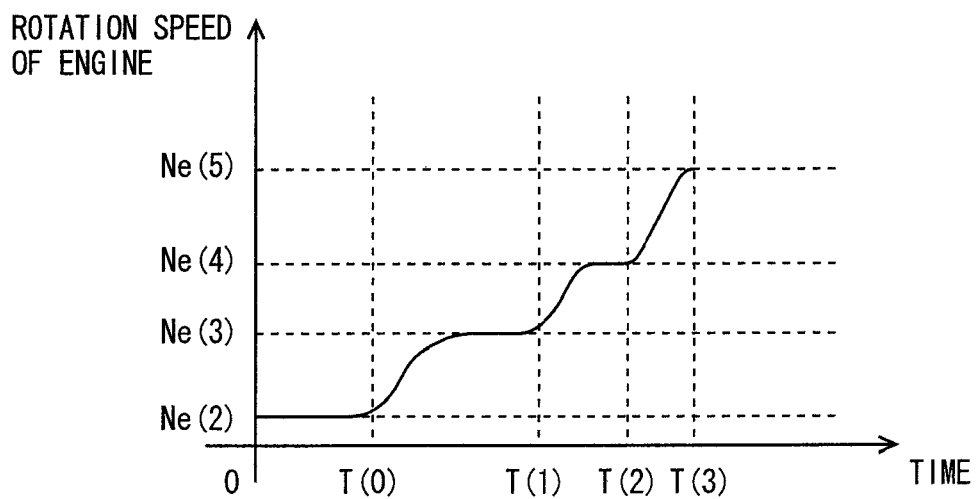
FIG. 6 is a timing plot (1) representing how the rotation speed of an engine varies.

Herein, if the rotation speed of the engine is elevated, as controlled through a process with a predetermined value set as a rate of change applied to the rotation speed of the engine, then, as shown in FIG. 6, engine 100 has its rotation speed elevated from Ne(2) to Ne(3). At the time, engine 100 has its rotation speed controlled with a predetermined value serving as an upper limit value for the rate of change applied to the rotation speed of the engine to allow the rotation speed of the engine to smoothly elevate in view of preventing shock and protecting components. Note that such process performed to control elevating the rotation speed of the engine can be performed with well known art. Accordingly the process will now be described in detail.

At time T(1), as shown in FIG. 5, the driver operates the shift lever, and accordingly the fourth stage shifts to the third stage.

Accordingly, ECU 1000 calculates a lower limit value Ne(4), as based on the rotation speed of output shaft 600, from a map corresponding to the third stage shown in FIG. 4, and controls the rotation speed of the engine, as based on lower limit value Ne(4) as calculated.

Herein if the rotation speed of the engine is elevated in a process with a predetermined value set as a rate of change applied to the rotation speed of the engine, then, as shown in FIG. 6, the engine has its rotation speed elevated from Ne(3) to Ne(4). At the time, engine 100 has its rotation speed controlled with a predetermined value serving as an upper limit value for the rate of change applied to the rotation speed of the engine to allow the rotation speed of the engine to smoothly elevate.

At time T(2), as shown in FIG. 5, the driver operates the shift lever, and accordingly the third stage shifts to the second stage.

Accordingly, ECU 1000 calculates a lower limit value Ne(5), as based on the rotation speed of output shaft 600, from a map corresponding to the second stage shown in FIG. 4, and controls the rotation speed of the engine, as based on lower limit value Ne(5) as calculated.

Herein if the rotation speed of the engine is elevated in a process with a predetermined value set as a rate of change applied to the rotation speed of the engine, then, as shown in FIG. 6, the engine has its rotation speed elevated from Ne(4) to Ne(5). At the time, engine 100 has its rotation speed controlled with a predetermined value serving as an upper limit value for the rate of change applied to the rotation speed of the engine to allow the rotation speed of the engine to smoothly elevate.

In the above variation, as shown in FIGS. 5 and 6, a period of time T(2)-T(1) elapsing after the fourth stage is shifted to the third stage before the third stage is shifted to the second stage, is shorter than a period of time T(1)-T(0) elapsing after the fifth stage is shifted to the fourth stage before the fourth stage is shifted to the third stage.

If shifting a stage is followed by another such shifting, with a short period of time elapsing therebetween, the driver intends to shift from the fourth stage via the third stage to the second stage by quick operation to cause the vehicle to rapidly manifest larger engine braking force.

However, as shown in FIG. 6, if the rate of change applied to the rotation speed of the engine is set uniformly at a predetermined value irrespectively of the time that elapses between shiftings, then, the rotation speed of the engine may change with a delay before at least the lower limit value for the rotation speed of the engine that corresponds to the second stage is attained, while the driver expects large engine braking force to manifests early.

Furthermore, if the rotation speed may change with a delay, then the driver attempts to cause the vehicle to manifest larger engine braking force and accordingly performs an operation to lower a stage more than necessary. This operates MG (1) 200 in an increased amount. This results in a battery consumed more or a torque varying significantly, which for example causes shock in the vehicle.

Accordingly, in the present invention, ECU 1000 sets a rate of change applied to the rotation speed of engine 100 in accordance with a period of time elapsing after a shift position was immediately previously changed before the shift position is currently changed, and ECU 1000 controls MG (1) 200 and engine 100 to increase the rotation speed of engine 100 at the set rate of change.

Figure 7:
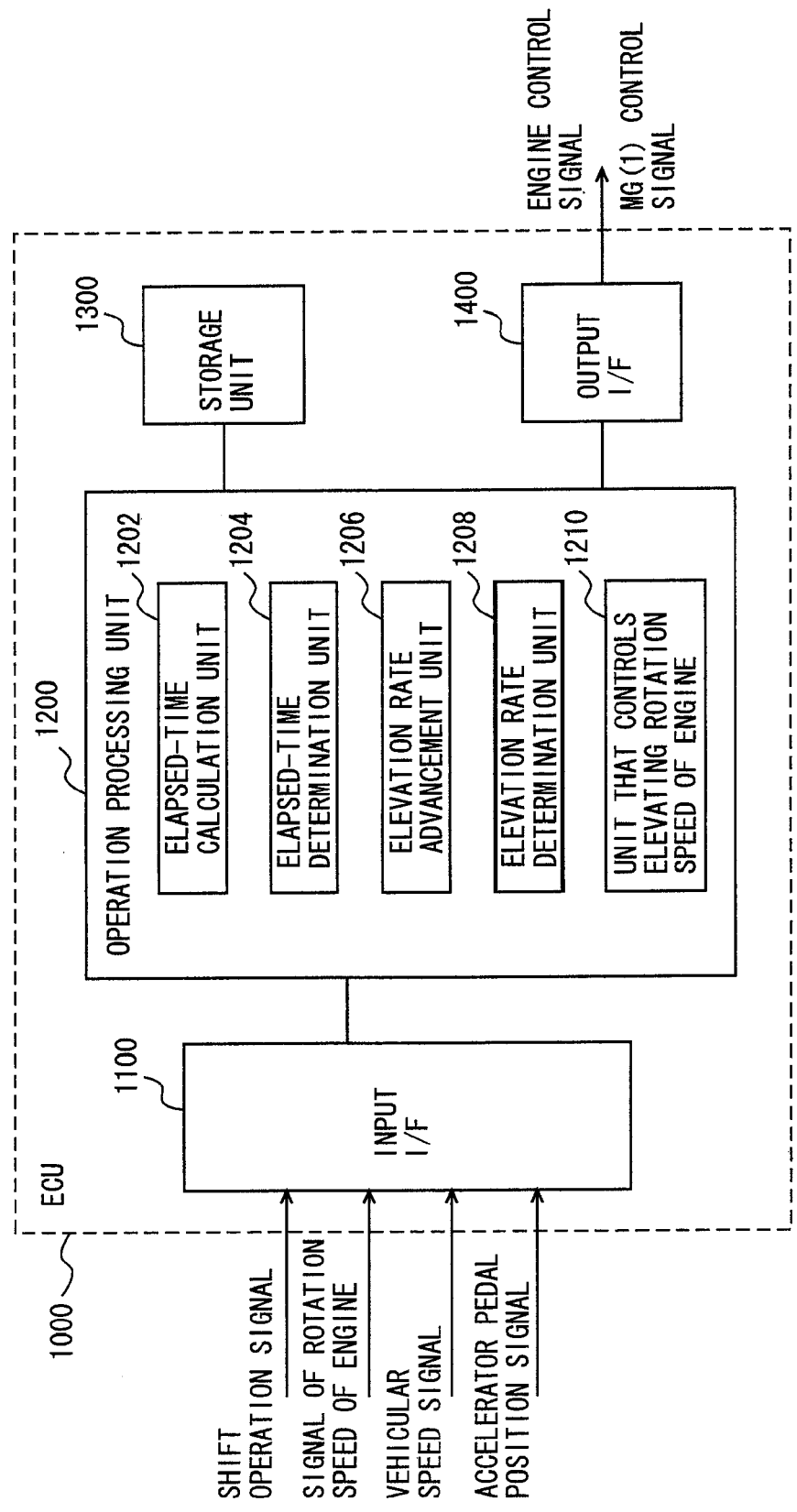
FIG. 7 is a function block diagram of an ECU implementing a vehicular control device of an embodiment.

FIG. 7 is a function block diagram of ECU 1000 implementing the vehicular control device of the present embodiment.

ECU 1000 includes an input interface (I/F) 1100, an operation processing unit 1200, a storage unit 1300, and an output interface (I/F) 1400.

Input I/F 100 receives a shift operation signal from the shift position sensor, a signal of the rotation speed of the engine from the engine revolution sensor, a vehicular speed signal from vehicular speed sensor 1050, and an accelerator pedal position signal from the accelerator pedal position sensor, and transmits the signals to operation processing unit 1200.

Operation processing unit 1200 includes an elapsed-time calculation unit 1202, an elapsed-time determination unit 1204, an elevation rate advancement unit 1206, an elevation rate determination unit 1208, and a unit 1210 that controls elevating the rotation speed of the engine.

Elapsed-time calculation unit 1202 calculates a period of time elapsing after a shift position was immediately previously changed before the shift position is currently changed. In the present embodiment, when the accelerator pedal is not depressed, elapsed-time calculation unit 1202 starts a timer, as based on the shift operation signal, after a stage was previously changed. In other words, it sets the timer's count value at an initial value. Note that elapsed-time calculation unit 1202 determines from the accelerator pedal position signal whether the accelerator pedal is not depressed.

When elapsed-time calculation unit 1202 detects in response to the shift operation signal that a stage is currently changed, elapsed-time calculation unit 1202 calculates as an elapsed period of time a period of time measured by the timer, and simultaneously resets the timer's count value to the initial value.

Alternatively, elapsed-time calculation unit 1202 may read a value that is counted by a separately operated timer unit whenever an operation is performed to change a stage, and elapsed-time calculation unit 1202 may use a difference from a previously read count value to calculate an elapsed period of time.

Note that elapsed-time calculation unit 1202 may store a calculated, elapsed period of time temporarily in storage unit 1300.

Elapsed-time determination unit 1204 determines whether the calculated, elapsed period of time is at most a predetermined period of time. The predetermined value is not limited to a particular period of time. It may be any period of time that allows a decision that a shift position is changed by a fast operation. It is adapted through an experiment or the like. If the calculated, elapsed period of time is at most the predetermined period of time, elapsed-time determination unit 1204 may turn on an elapsed-time determination flag.

If elapsed-time determination unit 1204 calculates that the elapsed period of time is at most the predetermined period of time, elevation rate advancement unit 1206 performs a process to advance an elevation rate applied to the rotation speed of engine 100. More specifically, elevation rate advancement unit 1206 increases an elevation rate to be applied to engine 100. Elevation rate advancement unit 1206 may increase the elevation rate by: a predetermined amount; an amount corresponding to a stage after it is shifted; or an amount corresponding to an elapsed period of time. For example, if the elapsed period of time is shorter, elevation rate advancement unit 1206 may increase the elevation rate by a larger amount. Alternatively, elevation rate advancement unit 1206 may increase the elevation rate by an amount set as based on a map, table or mathematical expression of an elapsed period of time and an amount to be increased.

Elevation rate advancement unit 1206 may perform the process that advances an elevation rate applied to the rotation speed of engine 100 when the elapsed-time determination flag is turned on. Furthermore, elevation rate advancement unit 1206 may for example store the advanced elevation rate temporarily in storage unit 1300.

In accordance with a decision made by elapsed-time determination unit 1204, elevation rate determination unit 1208 determines an elevation rate to be applied to the rotation speed of engine 100. For example, if elapsed-time determination unit 1204 determines that a calculated, elapsed period of time is larger than a predetermined period of time, then elevation rate determination unit 1208 determines a predetermined value as the elevation rate to be applied. If elapsed-time determination unit 1204 determines that a calculated, elapsed period of time is at most the predetermined period of time, then elevation rate determination unit 1208 determines the predetermined value plus a predetermined increment as the elevation rate to be applied.

Note that if a decision is made that a calculated, elapsed period of time is at most the predetermined period of time, and a value larger than the predetermined value is set, elevation rate determination unit 1208 is not limited particularly to the manner of advancement that adds an increment.

For example, elevation rate determination unit 1208 may determine an elevation rate corresponding to an elapsed period of time calculated. Elevation rate determination unit 1208 may previously store in storage unit 1300 a map or the like representing a relationship between an elapsed period of time and an elevation rate, and may determine an elevation rate from an elapsed period of time and the map if the elapsed period of time is at most a predetermined period of time. The map may be replaced with a table or a mathematical expression. The map may be a linear map or a nonlinear map.

Furthermore, elevation rate determination unit 1208 may be adapted to set a different elevation rate for each stage. More specifically, if a decision is made that an elapsed period of time is at most a predetermined period of time, elevation rate determination unit 1208 determines a predetermined elevation rate corresponding to the currently selected shift position. For example, an elevation rate may be set that increases when a stage is shifted to another stage having a larger number, or an elevation rate may be set that increases when a stage is shifted to another stage having a smaller number.

Unit 1210 that controls elevating the rotation speed of the engine controls MG (1) 200 to set the rotation speed of the engine in accordance with the determined elevation rate to be at least that lower limit value for the rotation speed of the engine which corresponds to the stage of interest. In doing so, unit 1210 that controls elevating the rotation speed of the engine controls MG (1) 200 such that the rotation speed of the engine varies gently at its early and late stages of variation to prevent abrupt torque variation to reduce shock and protect components. Once the rotation speed of engine 100 has attained at least the lower limit value, unit 1210 that controls elevating the rotation speed of the engine ceases to supply engine 100 with fuel.

Unit 1210 that controls elevating the rotation speed of the engine transmits an engine control signal via output I/F 1400 to engine 100 to cease supplying fuel or transmits an MG (1) control signal to MG (1) 200 to elevate the rotation speed of the engine.

Furthermore, while in the present embodiment elapsed-time calculation unit 1202, elapsed-time determination unit 1204, elevation rate advancement unit 1206, elevation rate determination unit 1208, and unit 1210 that controls elevating the rotation speed of the engine are all described as those functioning as software that are implemented by a central processing unit (CPU), which corresponds to operation processing unit 1200, executing a program stored in storage unit 1300, they may be implemented by hardware. Note that such program is stored in a storage medium and mounted in the vehicle.

Storage unit 1300 has a variety of information, programs, threshold values, maps and the like stored therein and operation processing unit 1200 reads/stores data therefrom/thereto.

Figure 8:
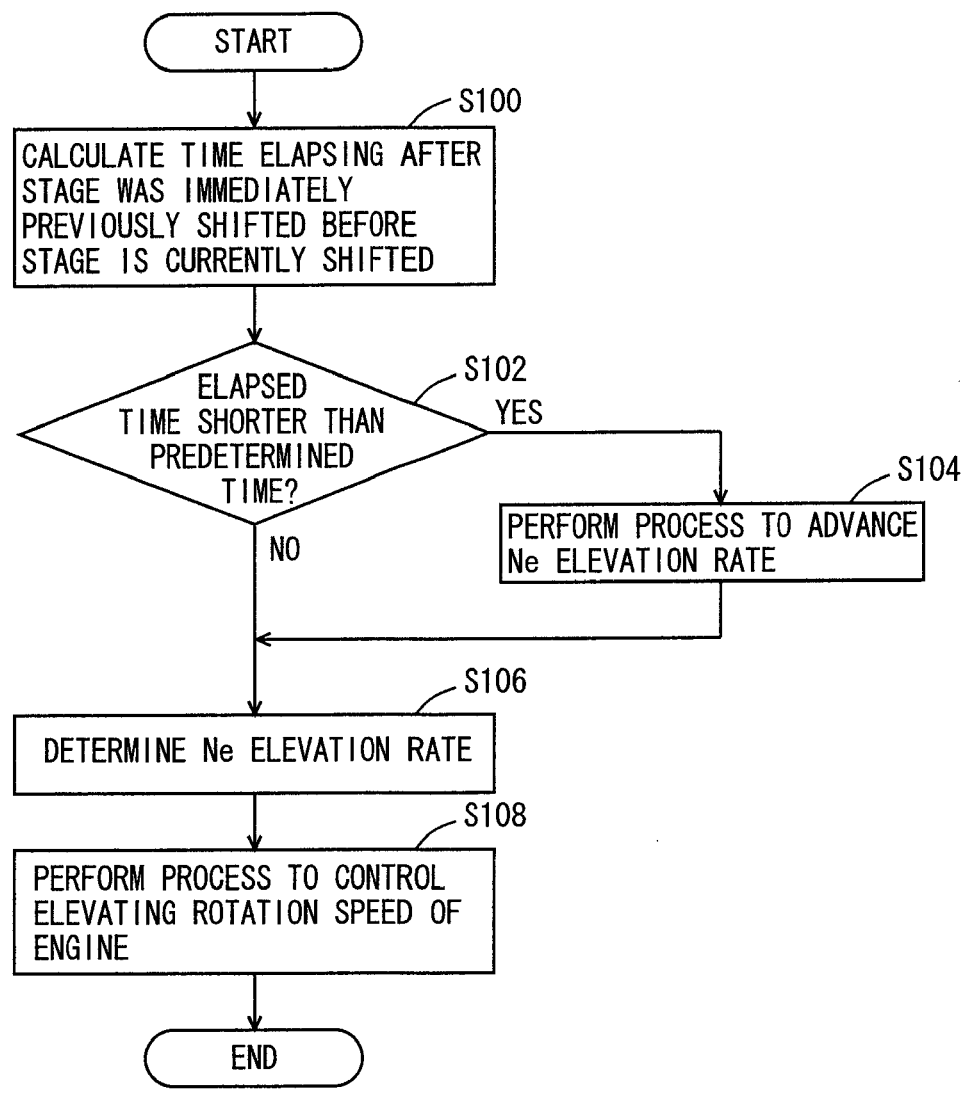
FIG. 8 is a flowchart of a structure of a program for control that is executed in the ECU implementing the vehicular control device of the embodiment.

Hereinafter reference will be made to FIG. 8 to describe a structure of a program for control that is executed by ECU 1000 implementing the vehicular control device of the present embodiment.

At step (S)100, ECU 1000 calculates a period of time elapsing after a stage was immediately previously shifted before it is currently shifted. At S102, ECU 1000 determines whether the elapsed period of time is at most a predetermined period of time. If so (YES at S102) ECU 1000 proceeds to S104. Otherwise (NO at S102), ECU 1000 proceeds to S106.

At S104, ECU 1000 performs a process advancing an elevation rate applied to a number Ne of revolutions of the engine. At S106, ECU 1000 determines an elevation rate. If the advancement process is not performed, ECU 1000 determines a predetermined elevation rate that is stored in a memory of ECU 1000 as an elevation rate to be used in the process performed to control elevating the rotation speed of the engine. If the advancement process is performed, ECU 1000 determines an increased elevation rate as an elevation rate to be used in the process performed to control elevating the rotation speed of the engine.

At S108, ECU 1000 performs the process in accordance with the determined elevation rate to control elevating the rotation speed of the engine.

In accordance with the above configuration and flowchart, the present embodiment provides a vehicular control device, or ECU 1000, operating as will now be described hereinafter with reference to FIGS. 9 and 10.

For example, let us assume that a driver driving the vehicle operates the shift lever to change a shift position from the fifth stage to the second stage stepwise.

Figure 9:
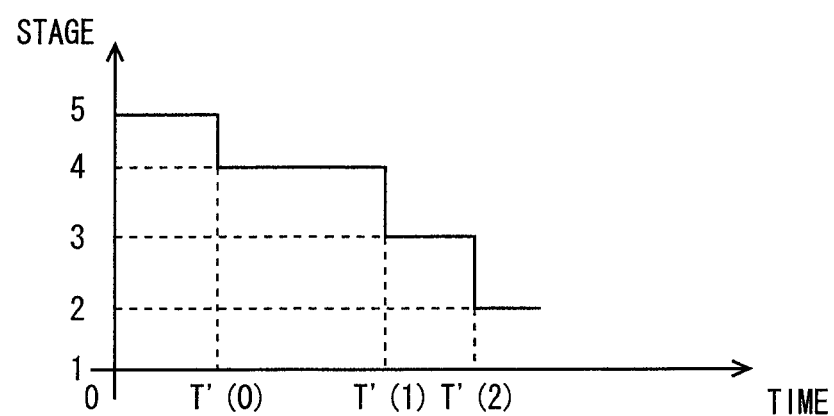
FIG. 9 is a timing plot (2) representing how a shift position varies.
Figure 10:
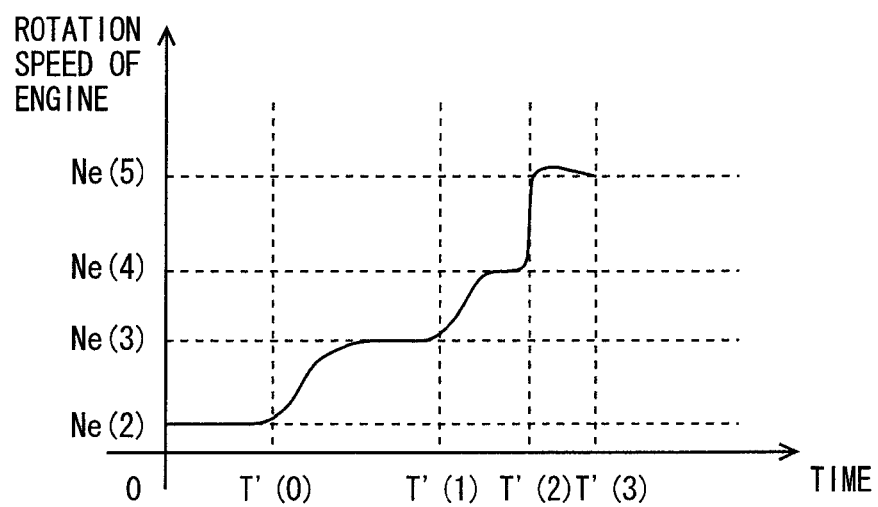
FIG. 10 is a timing plot (2) representing how the rotation speed of an engine varies.

At time T'(0), as shown in FIG. 9, the driver operates the shift lever, and accordingly the current stage shifts from the fifth stage to the fourth stage.

At the time, a period of time elapsing after a stage was immediately previously shifted to the fifth stage before the fifth stage is currently shifted to the fourth stage, is calculated (S100). If the elapsed period of time is larger than a predetermined period of time (NO at S102) a predetermined value is determined as an elevation rate (S106) and the process performed to control elevating the rotation speed of the engine is performed (S108).

More specifically, in response to a stage being shifted to the fourth stage, ECU 1000 calculates lower limit value Ne(3), as based on the rotation speed of output shaft 600, from a map corresponding to the fourth stage as shown in FIG. 4, and controls the rotation speed of the engine in accordance with lower limit value Ne(3) as calculated. More specifically, ECU 1000 controls MG (1) 200 to elevate the rotation speed of engine 100 until at least lower limit value Ne(3) as calculated is attained. Once the rotation speed of the engine has attained at least lower limit value Ne(3), supplying engine 100 with fuel is ceased. Note that the process performed to control elevating the rotation speed of the engine is performed when the accelerator pedal is not depressed.

At the time, in the process performed to control elevating the rotation speed of the engine, a predetermined value is set as a rate of change applied to the rotation speed of the engine. As shown in FIG. 10, engine 100 has its rotation speed controlled with a predetermined value serving as an upper limit value for the rate of change applied to the rotation speed of the engine to allow the rotation speed of the engine to smoothly elevate in view of preventing shock and protecting components.

At time T'(1), as shown in FIG. 9, the driver operates the shift lever, and accordingly the fourth stage shifts to the third stage.

At the time, a period of time T'(0)-T'(1) elapsing after a stage was immediately previously shifted to the fourth stage before the fourth stage is currently shifted to the third stage, is calculated (S100). If the elapsed period of time T'(0)-T'(1) is larger than a predetermined period of time (NO at S102) a predetermined value is determined as an elevation rate (S106) and the process performed to control elevating the rotation speed of the engine is performed (S108).

More specifically, in response to a stage being shifted to the third stage, ECU 1000 calculates lower limit value Ne(4), as based on the rotation speed of output shaft 600, from a map corresponding to the third stage as shown in FIG. 4, and controls the rotation speed of the engine in accordance with lower limit value Ne(4) as calculated. As shown in FIG. 10, engine 100 has its rotation speed controlled through the elevation controlling process to elevate from Ne(3) to Ne(4) smoothly.

At time T'(2), as shown in FIG. 9, the driver operates the shift lever, and accordingly the third stage shifts to the second stage.

At the time, a period of time T'(2)-T'(1) elapsing after a stage was immediately previously shifted to the third stage before the third stage is currently shifted to the second stage, is calculated (S100). If the elapsed period of time T'(2)-T'(1) is smaller than a predetermined period of time (YES at S102) the predetermined value plus a predetermined amount to be increased is provided (S104) to determine an elevation rate (S106) and the process performed to control elevating the rotation speed of the engine is performed at the determined elevation rate (S108).

More specifically, in response to a stage being shifted to the second stage, ECU 1000 calculates lower limit value Ne(5), as based on the rotation speed of output shaft 600, from a map corresponding to the second stage as shown in FIG. 4, and controls the rotation speed of the engine in accordance with lower limit value Ne(5) as calculated. As shown in FIG. 10, engine 100 has its rotation speed controlled by the elevation controlling process to elevate from Ne(4) to Ne(5) smoothly.

The elevation rate is set at a value larger than the predetermined value. Accordingly, a period of time required to vary Ne(4) to Ne(5) is shorter than that required to vary Ne(2) to Ne(3) and that required to vary Ne(3) to Ne(4). At time T'(3), the rotation speed of engine 100 attains Ne(5).

Thus the present embodiment provides a vehicular control device that can set a rate of change that is applied to the rotation speed of an engine in accordance with a period of time elapsing after a shift position was immediately previously changed before it is currently changed, so that the rate of change applied to the rotation speed of the engine can be changed in accordance with an interval between an operation shifting the shift lever to change a shift position and another such operation. If the elapsed period of time is at most a predetermined period of time, the rate of change applied to the rotation speed of the engine can be increased. Thus if the driver quickly changes a shift position, the rate of change applied to the rotation speed of the engine is set to increase. Thus the rotation speed of the engine is elevated by MG (1)

rapidly. Thus if the driver attempts to obtain large engine braking force and accordingly changes a shift position quickly, the driver can be prevented from feeling a delay in varying the rotation speed of the engine. Consequently the vehicle can manifest engine braking force, as intended by the driver, with good responsiveness. Thus there can be provided a vehicular control device allowing a vehicle having an internal combustion engine and a rotating electric machine as driving sources to manifest engine braking force in response to the driver's operation with good responsiveness, a method of controlling the vehicle and a program implementing the method with a computer, and a storage medium having the program stored therein.

Note that while in the present embodiment the engine braking range position includes shift positions corresponding to five stages, it is not limited thereto and may include shift positions corresponding for example to two stages. In that case, the engine may have its rotation speed changed in accordance with a rate of change set to increase if a period of time elapsing after the D position was shifted to the engine braking range position before a shift is done in the engine braking range position is at most a predetermined period of time.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

The invention claimed is:

1. A vehicular control device for a vehicle with an internal combustion engine and a rotating electric machine serving as driving sources, said vehicle including a first rotating electric machine coupled with an output shaft of said internal combustion engine and generating electric power based on motive power of said internal combustion engine, a power split device transmitting the motive power of said internal combustion engine to a wheel shaft of said vehicle, and an accelerator pedal, said power split device splitting the motive power received from said internal combustion engine into one of driving force for said wheel shaft and motive power for said first rotating electric machine, between said power split device and said wheel shaft a second rotating electric machine being provided to provide said wheel shaft with driving force, the vehicular control device comprising:
a detection unit detecting a state of an operation member operated to select a shift position of a plurality of shift positions corresponding to a plurality of stages, respectively, each with a lower limit value for a rotation speed of said internal combustion engine; and
an operation unit connected to said detection unit, said operation unit programmed to be operative, in response to said accelerator pedal not being depressed, to: determine from said state as detected whether said shift position has been changed; set a rate of change applied to the rotation speed of said internal combustion engine in accordance with an elapsed period of time from when said shift position was previously changed until said shift position is currently changed; and control said first rotating electric machine in accordance with said rate of change, as set, to allow said internal combustion engine to have the rotation speed set at least at said lower limit value corresponding to said shift position.

2. The vehicular control device according to claim 1, wherein said operation unit sets said rate of change to increase as said elapsed period of time is shorter.

3. The vehicular control device according to claim 1, wherein said operation unit sets said rate of change to increase by a predetermined value if said elapsed period of time is at most a predetermined period of time.

4. The vehicular control device according to claim 1, wherein said operation unit determines whether said shift position is changed to another one of said shift positions that increases said lower limit value.

5. The vehicular control device according to claim 1, further comprising a revolution detection unit connected to said operation unit for detecting the rotation speed of said internal combustion engine, wherein if the rotation speed detected is at least said lower limit value corresponding to said shift position changed, said operation unit controls said internal combustion engine to cease to inject fuel for said internal combustion engine.

6. The vehicular control device according to claim 1, wherein:
said power split device, said second rotating electric machine and said wheel shaft are connected, with a transmission posed therebetween; and
said transmission changes torque of said second rotating electric machine and transmits the changed torque to said wheel shaft.

7. The vehicular control device according to claim 1, further comprising a requirement detection unit connected to said operation unit for detecting a degree of a requirement of force driving said vehicle, wherein if said degree of said requirement detected is substantially zero, said operation unit controls said first rotating electric machine to allow said internal combustion engine to have the rotation speed set at least said lower limit value corresponding to said shift position.

8. A method of controlling a vehicle with an internal combustion engine and a rotating electric machine serving as driving sources, said vehicle including a first rotating electric machine coupled with an output shaft of said internal combustion engine and generating electric power based on motive power of said internal combustion engine, a power split device transmitting the motive power of said internal combustion engine to a wheel shaft of said vehicle and an accelerator pedal, said power split device splitting the motive power received from said internal combustion engine into one of driving force for said wheel shaft and motive power for said first rotating electric machine, between said power split device and said wheel shaft a second rotating electric machine being provided to provide said wheel shaft with driving force, the method comprising the steps of:
detecting a state of an operation member operated to select a shift position of a plurality of shift positions corresponding to a plurality of stages, respectively, each with a lower limit value for a rotation speed of said internal combustion engine;
in response to said accelerator pedal not being depressed:
determining from said state as detected whether said shift position has been changed;
setting a rate of change applied to the rotation speed of said internal combustion engine in accordance with an elapsed period of time from when said shift position was previously changed until said shift position is currently changed; and
controlling said first rotating electric machine in accordance with said rate of change, as set, to allow said internal combustion engine to have the rotation speed set at least at said lower limit value corresponding to said shift position.

9. The method of controlling a vehicle according to claim 8, wherein the step of setting includes the step of setting said rate of change to increase as said elapsed period of time is shorter.

10. The method of controlling a vehicle according to claim 8, wherein the step of setting includes the step of setting said rate of change to increase by a predetermined value if said elapsed period of time is at most a predetermined period of time.

11. The method of controlling a vehicle according to claim 8, wherein the step of determining includes the step of determining whether said shift position is changed to another one of said shift positions that increases said lower limit value.

12. The method of controlling a vehicle according to claim 8, further comprising the steps of:
   detecting the rotation speed of said internal combustion engine; and
   controlling said internal combustion engine to cease to inject fuel for said internal combustion engine if said shift position is changed and the rotation speed detected is at least said lower limit value corresponding to said shift position changed.

13. The method of controlling a vehicle according to claim 8, wherein:
   said power split device, said second rotating electric machine and said wheel shaft are connected, with a transmission posed therebetween; and
   said transmission changes torque of said second rotating electric machine and transmits the changed torque to said wheel shaft.

14. The method of controlling a vehicle according to claim 8, further comprising the step of detecting a degree of a requirement of force driving said vehicle, wherein the step of controlling includes the step of controlling said first rotating electric machine to allow said internal combustion engine to have the rotation speed set at least said lower limit value corresponding to said shift position if said degree of said requirement detected is substantially zero.

* * * * *